(12) United States Patent
Rosenboom et al.

(10) Patent No.: US 7,828,353 B2
(45) Date of Patent: Nov. 9, 2010

(54) REFUSE TIPPER LATCHING DEVICE AND METHOD

(75) Inventors: Darin M. Rosenboom, Orange City, IA (US); Joshua L. Krikke, Sanborn, IA (US); Troy D. S. Howell, Mantorville, MN (US)

(73) Assignee: Rosenboom Machine & Tool, Inc., Sheldon, IA (US)

( * ) Notice: Subject to any disclaimer, the term of this patent is extended or adjusted under 35 U.S.C. 154(b) by 851 days.

(21) Appl. No.: 11/696,546

(22) Filed: Apr. 4, 2007

(65) Prior Publication Data

US 2008/0247851 A1    Oct. 9, 2008

(51) Int. Cl.
B65F 3/02    (2006.01)
(52) U.S. Cl. .......................................... 294/88; 414/408
(58) Field of Classification Search ................. 414/406, 414/408, 420, 421, 555, 620, 621; 294/88, 294/104, 116; 62/594, 537, 539
See application file for complete search history.

(56) References Cited

U.S. PATENT DOCUMENTS

| | | | | |
|---|---|---|---|---|
| 3,230,717 A | * | 1/1966 | Alden | 60/571 |
| 3,730,365 A | * | 5/1973 | Herpich et al. | 414/406 |
| 4,479,751 A | * | 10/1984 | Wyman et al. | 414/406 |
| 4,673,327 A | * | 6/1987 | Knapp | 414/408 |
| 4,687,405 A | * | 8/1987 | Olney | 414/408 |
| 4,773,812 A | * | 9/1988 | Bayne et al. | 414/408 |
| 5,026,241 A | * | 6/1991 | Wyman | 414/303 |
| 5,049,026 A | * | 9/1991 | Bingman et al. | 414/408 |
| 5,209,537 A | * | 5/1993 | Smith et al. | 294/111 |
| 5,772,385 A | * | 6/1998 | Huntoon et al. | 414/408 |

* cited by examiner

*Primary Examiner*—Dean J Kramer
(74) *Attorney, Agent, or Firm*—McKee, Voorhees & Sease, P.L.C.

(57) ABSTRACT

Slidably mounted within the cylinder 108 of the accumulator 46 is a piston 48. A spring 50 is positioned behind the piston 48, which biases the piston 48 toward port 56. The portion of the cylinder 108 occupied by spring 50 is vented to the atmosphere by breather 52, which allows air to pass in and out of cylinder 108. As a result of the spring 50 acting on the piston 48, fluid is collected, stored, and released from the cylinder 108 under pressure. It should be understood that the accumulator could collect, store and release fluid under pressure using energy storage devices other than spring 50. For example, the accumulator 46 could be gas.

19 Claims, 13 Drawing Sheets

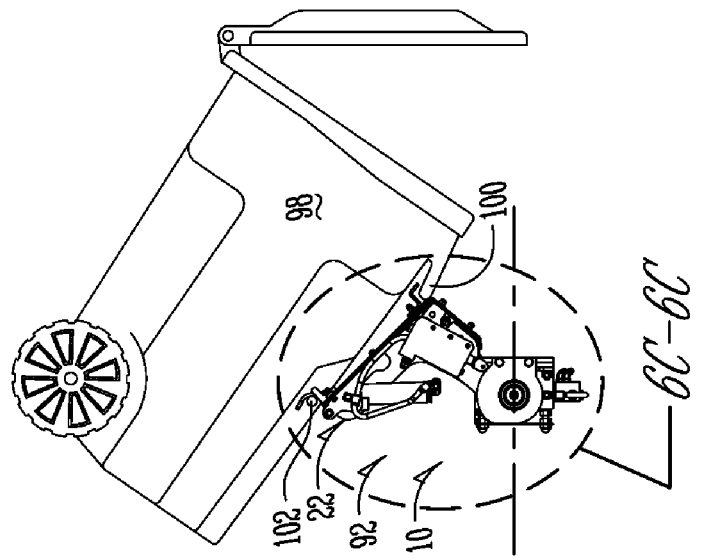
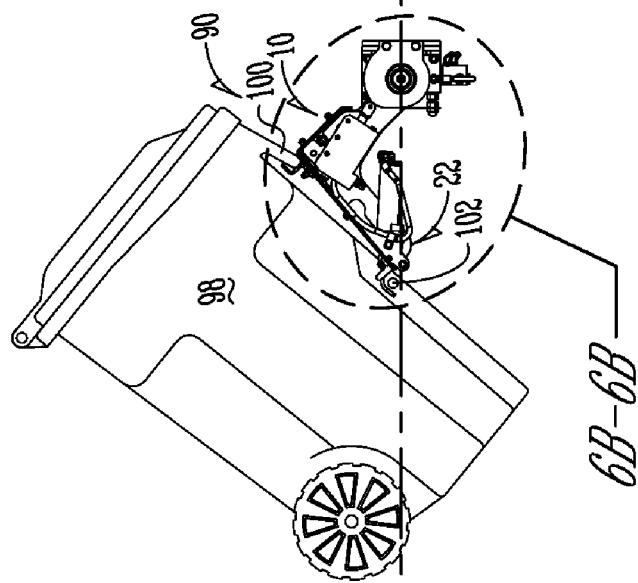
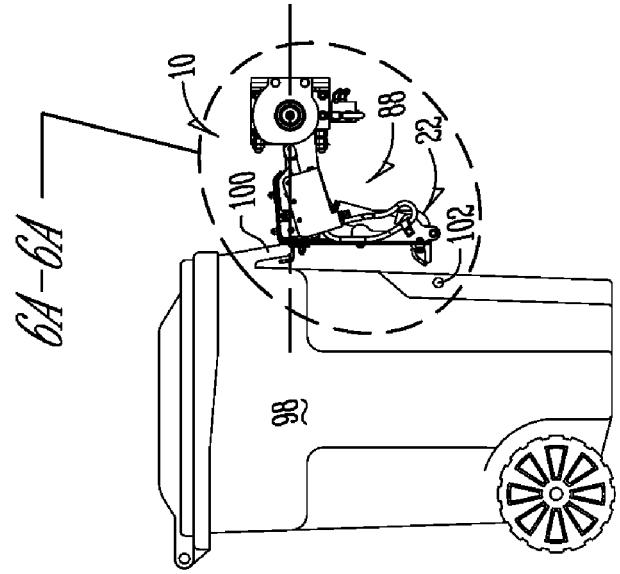

REFUSE TIPPER LATCHING DEVICE AND METHOD

FIELD OF THE INVENTION

The present invention relates to a latching device and method for a refuse cart tipper. More particularly, the present invention provides a new latching device and method that offers fail-safe precision timing and movement of the latch motion relative to the tipper lift motion so as to accommodate a broad range of refuse carts, account for obstructions in latch movement, and be readily adaptable to many different types of refuse cart tippers.

BACKGROUND OF THE INVENTION

Refuse cart tippers ("tippers") are well known in the prior art. These tippers use mechanical linkage to rotate or slide a latch for hooking a bar on the refuse cart so that the cart does not fall off the tipper. Using mechanical linkage to operate latch motion has many disadvantages. For example, mechanical linkage systems will break or bend if an obstruction is in the latch path. Therefore, there is a need for a refuse tipper latching device and method that protects operational members and components of the latch system from damage.

Refuse carts differ in shape and size. For example, the position of the lower bar relative to the upper lip may vary between refuse carts. Therefore, the system for driving the hook or slider latch must be adaptable and flexible to account for size variations in the refuse cart. Often with mechanical latches that use linkage bars to rotate or slide a latch, the range of motion and timing of the latch is difficult to control and adjust. For example, if the lower bar on the refuse cart is outside the range of motion configured into the mechanical linkage of the latch, the latch will either fail to hook the lower bar of the refuse cart resulting in the refuse cart coming unhooked from the tipper or the latch will bend or break the lower bar. Therefore, there is a need for a refuse tipper latching device and method that accounts for changes in the position of the lower bar by providing adaptable motion and timing of the latch relative to the position or motion of the tipper and/or position of the lower bar and/or upper lip to prevent damage to the refuse cart.

Oftentimes with refuse tippers, the mechanical linkage for operating the latch is a restrictive design feature which means that the refuse tipper may only be used for certain operating heights, size and shaped refuse carts, and ranges of movement, rotational or otherwise. Therefore, there is need for a refuse tipper latching device and method that can be adapted and incorporated into many types of refuse tippers regardless of the range of operating motion, heights, and/or configurations.

BRIEF SUMMARY OF THE INVENTION

Therefore, it is a primary object, feature, or advantage of the present invention to improve over the state of the art.

A further object, feature, or advantage of the present invention is to provide a refuse tipper latching device and method wherein a master cylinder is in fluid communication with slave cylinder by a flexible hose to operate a latch for keeping a refuse cart on a refuse tipper.

Yet another object, feature, or advantage of the present invention is to provide a refuse tipper latching device and method wherein the master cylinder has a rod, and a roller attached to the rod adapted to follow a cam plate as the tipper moves.

A further object, feature, or advantage of the present invention is to provide a refuse tipper latching device and method wherein fluid is displaced from the master cylinder into a slave cylinder that is attached to a latch for keeping a refuse cart on the refuse tipper.

Yet another object, feature, or advantage of the present invention is to provide a refuse tipper latching device and method wherein the slave cylinder is spring-returned so as to force fluid back into the master cylinder and retract the latch.

Still another object, feature, or advantage of the present invention is to provide a refuse tipper latching device and method wherein the master cylinder is in fluid communication through a counterbalance valve with an accumulator so that if fluid pressure exceeds the pressure set point of the counterbalance valve, due to some obstruction, the counterbalance valve opens to allow fluid into the accumulator.

Yet another object, feature, or advantage of the present invention is to provide a refuse tipper latching device and method wherein fluid within the accumulator is used collected, stored and released under pressure.

One or more of these and/or other objects, features, or advantages of the present invention will become apparent from the specification and claims that follow.

According to one aspect of the present invention, a latching device for holding a refuse cart to a refuse tipper is disclosed. The latching device uses a master cylinder in fluid communication with a slave cylinder. The slave cylinder is adapted to operate a latch to thereby retain the refuse cart on the refuse tipper. In the preferred form, the master cylinder has a cylinder adapted to slidably receive a rod having a first end for movement within the cylinder and a roller operably attached to a second opposite end of the rod for movement without the cylinder. The roller is biased against a cam plate by a spring acting within the cylinder against the first end of the rod. The roller travels along the cam plate when moving the refuse tipper. The cam plate is adapted to time movement of the latch to thereby secure the refuse cart to the refuse tipper upon travel of the roller along the cam plate, which moves the rod to force fluid through a hose into the slave cylinder. The master cylinder has an accumulator with a piston slidably mounted and spring biased therein to receive, store and release fluid under pressure. The master cylinder also has a counterbalance value adapted to control movement of fluid between the accumulator and the cylinder so that fluid is forced through the counterbalance valve into the accumulator if the latch is obstructed, which prevents damage to the latching device and/or the refuse cart. The slave cylinder has a cylinder adapted to slidably receive a rod having a first end attached to and moved by a piston slidably mounted within the cylinder and a rod end mount operably attached to a second opposite end of the rod for movement without the cylinder. The latch is operably attached to the rod end mount so that fluid forced from the master cylinder extends the latch into a latching position to hold a lower bar on the refuse cart.

A new method for latching a refuse cart to a refuse tipper is also disclosed. The method includes providing a latching device with a master cylinder in fluid communication with a slave cylinder. The slave cylinder is adapted to operate a latch for keeping the refuse cart on the refuse tipper. The method also includes forcing fluid from the master cylinder into the slave cylinder when moving the refuse tipper and extending the latch with the slave cylinder to keep the refuse cart on the refuse tipper. In the preferred form, the method includes providing a rod for forcing fluid out of the master cylinder having a roller spring biased against a cam plate shaped to drive the roller relative to the position of the refuse tipper, following the cam plate with the roller when moving the refuse tipper to thereby extend or retract the latch, retracting the latch for releasing the refuse cart from the refuse tipper by forcing fluid from the slave cylinder into the master cylinder, and preventing damage to the refuse cart and/or the latching device by forcing fluid through a counterbalance valve into an accumulator when fluid pressure exceeds settings for the counterbalance valve.

BRIEF DESCRIPTION OF THE DRAWINGS

While the specification concludes with the claims particularly pointing out and distinctly claiming the invention, it is believed that the present invention will be better understood from the following description taken in conjunction with the accompanied drawings in which:

FIG. 5A is a side cut-away view of the refuse tipper and latching device in the engagement position according to an exemplary embodiment of the present invention.

FIG. 5B is a side cut-away view of the refuse tipper and latching device with the refuse cart in a lifted position according to an exemplary embodiment of the present invention.

FIG. 5C is a side cut-away view of the refuse tipper and latching device with the refuse cart in a dump position according to an exemplary embodiment of the present invention.

DETAILED DESCRIPTION OF THE PREFERRED EMBODIMENTS

The present invention includes a number of aspects, all of which have broad and far-reaching application. One aspect of the present invention relates to providing a refuse tipper latching device and method wherein a master cylinder is in fluid communication with a slave cylinder by a flexible hose to operate a latch for keeping a refuse cart on a refuse tipper. Another aspect of the present invention is to provide a refuse tipper latching device and method wherein the master cylinder has a rod, and a roller attached to the rod adapted to follow a cam plate as the tipper moves. Another aspect of the present invention relates to the use of a refuse tipper latching device and method wherein fluid is displaced from the master cylinder into a slave cylinder that is attached to a latch for keeping the refuse cart on the refuse tipper. Still another aspect of the present invention is to provide a refuse tipper latching device and method wherein the slave cylinder is spring-returned so as to force fluid back into the master cylinder and retract the latch. Although specific embodiments are described herein, the present invention is not to be limited to these specific embodiments. The present invention contemplates numerous other options in the design and use of the refuse tipper latching device and method.

Figure 1:
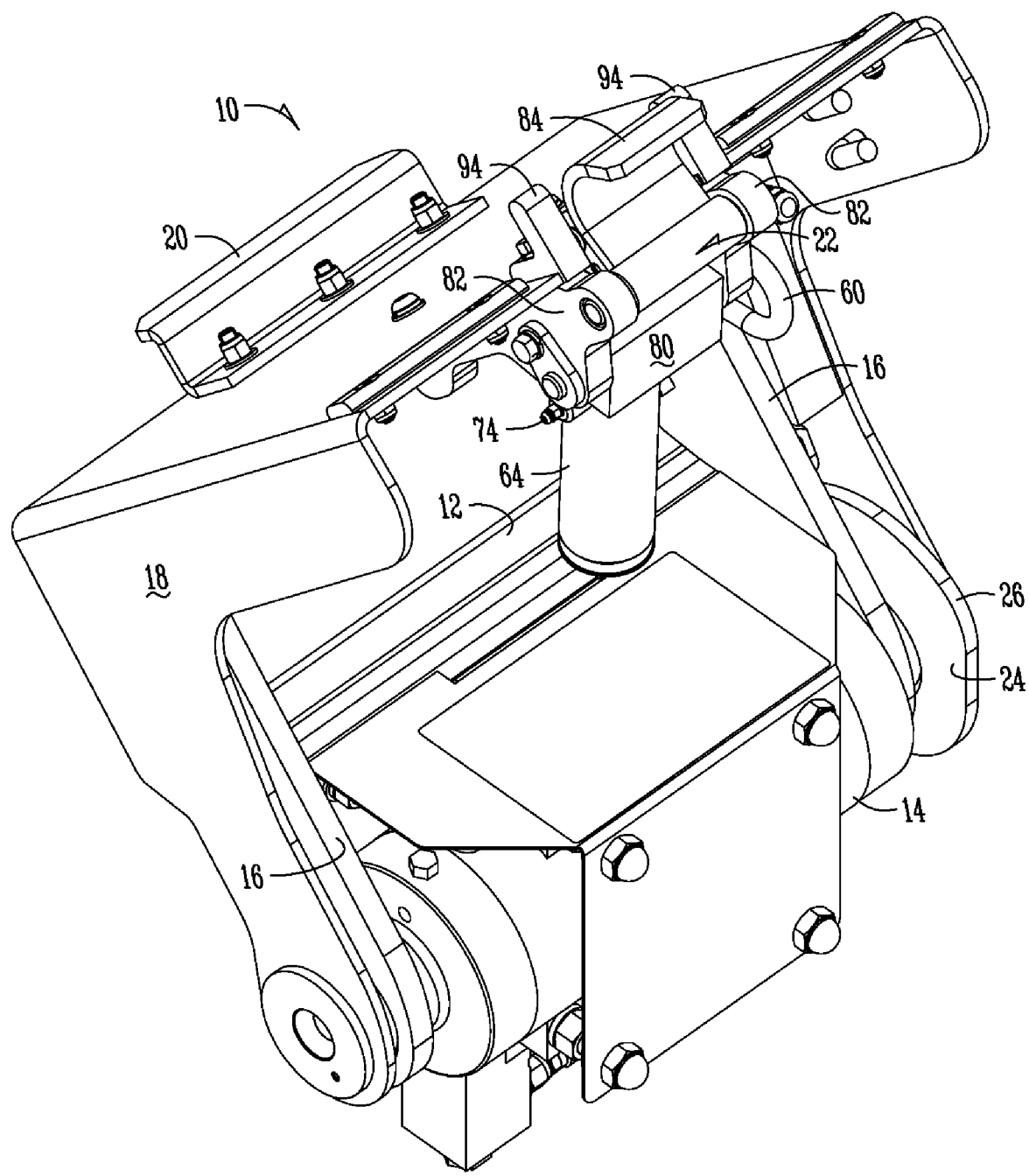
FIG. 1 is an isometric view of the refuse tipper and latching device according to an exemplary embodiment of the present invention.

FIG. 1 is an isometric view of the refuse tipper latching device according to an exemplary embodiment of the present invention. FIG. 1 shows the latching device 22 mounted one style or type of a refuse tipper 10. It should be understood that due to the flexibility of the latching device 22, using the combination of master cylinder 30 and slave cylinder 64 to operate, could be configured to various styles and types of refuse tippers. For example, it could be configured to operate on a four-bar refuse tipper and/or any other style of refuse tipper known in the art, whether for stationary or mobile applications.

Figure 2:
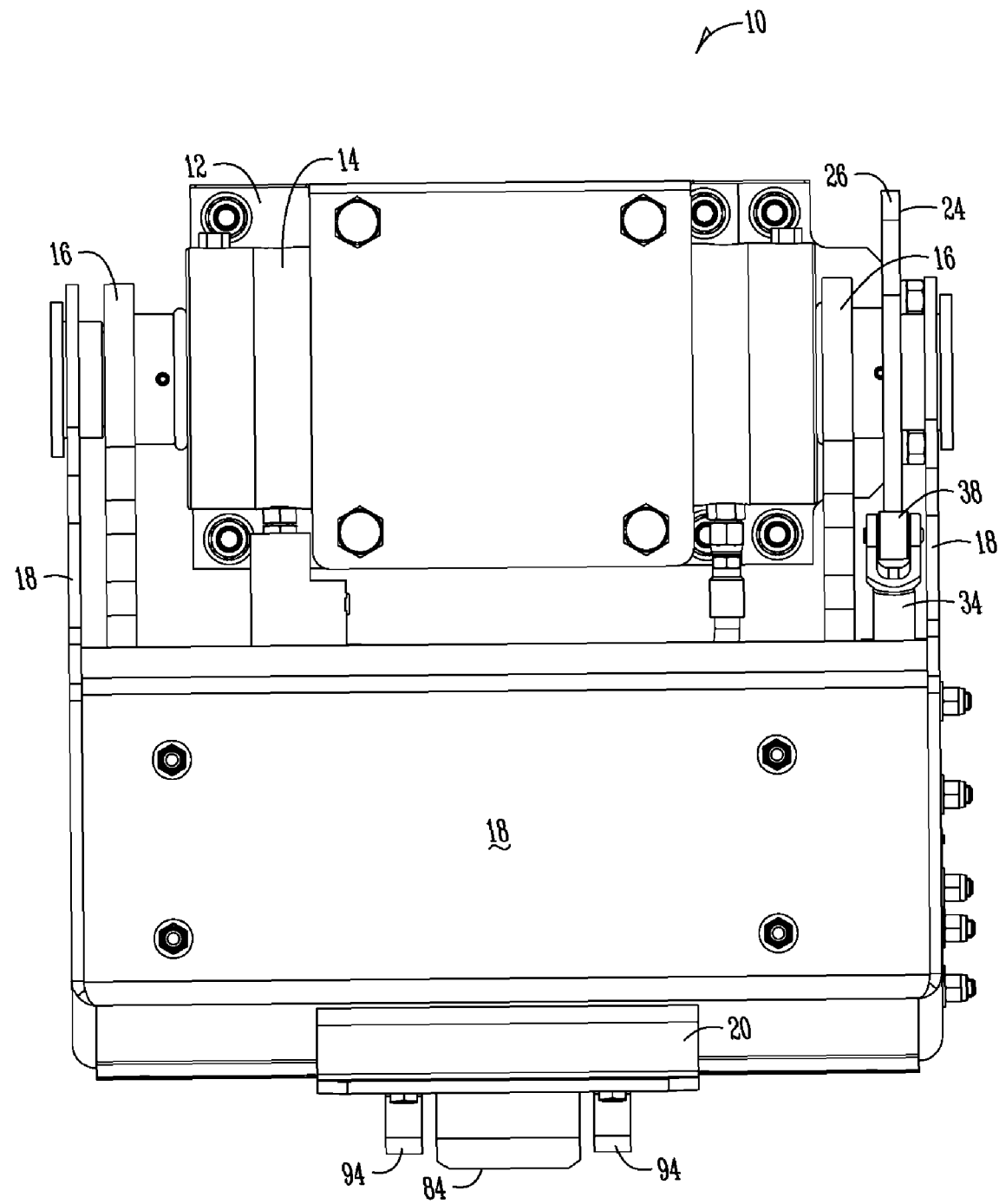
FIG. 2 is a front view of the refuse tipper and latching device according to an exemplary embodiment of the present invention.
Figure 3:
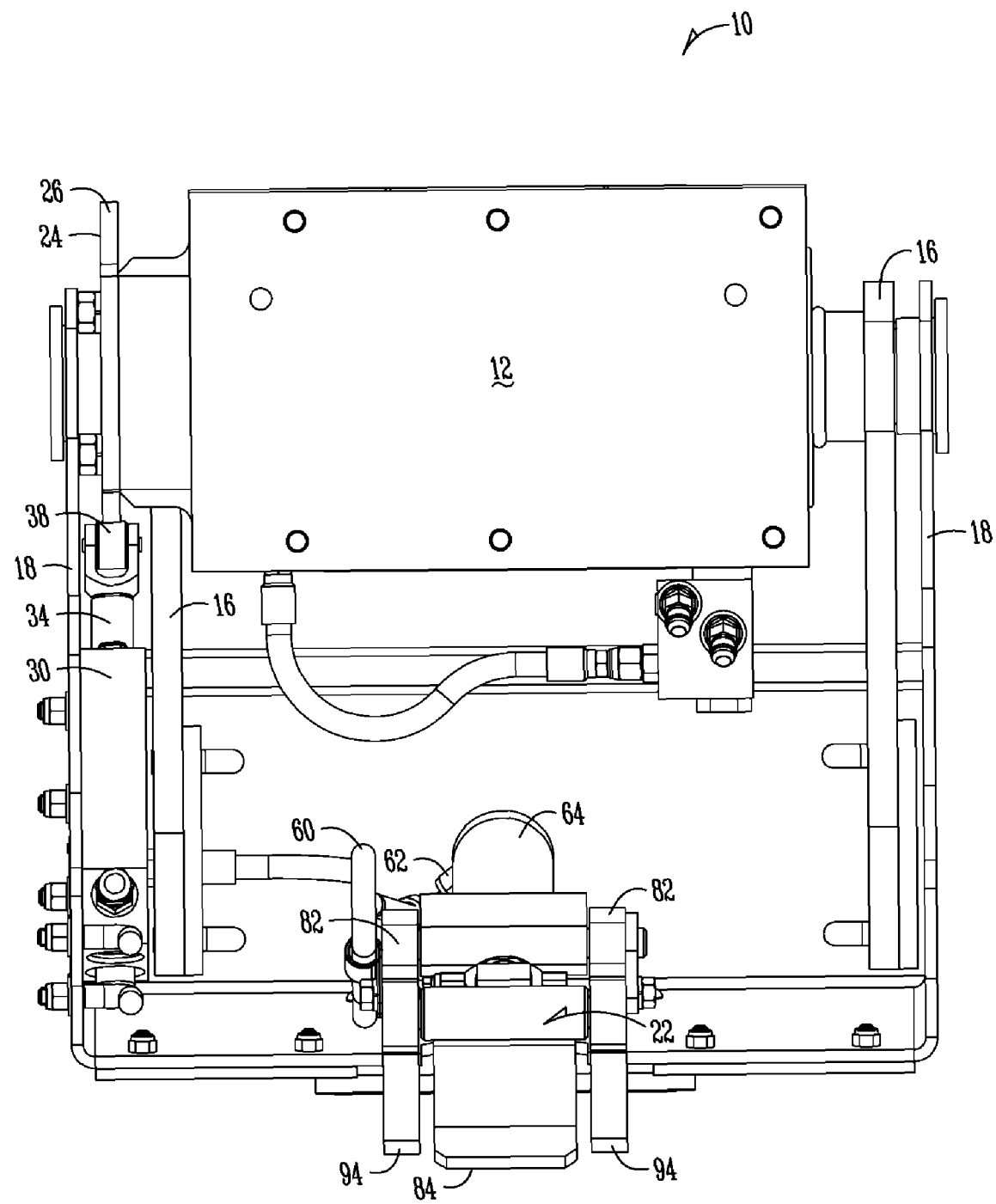
FIG. 3 is a back view of the refuse tipper and latching device according to an exemplary embodiment of the present invention.

The refuse tipper 10 has a mounting plate 12, as best shown in FIG. 3, for securing the refuse tipper 10 to some transportation unit, such as a garbage truck, or a stationary unit, such as a refuse compactor or dumpster. Rotary actuator 14 is secured to the mounting plate 12. A torque arm 16 is rotatably mounted on both sides of the rotary actuator 14 to thereby rotate the face plate 18 about the rotary actuator 14. Mounted between the torque arm 16 and the face plate 18 is a cam plate 24 having a roller path 26 around its outer circumference. It can be appreciated that the cam plate 24 need not be necessarily mounted between the torque arm and face plate, but may be mounted elsewhere relative to the rotary actuator 14. Also, saddle 20 is mounted to the face plate 18. The saddle 20 is for gripping the upper lip 100 of a refuse cart 98 as best shown in FIGS. 5A-5C and 6A-6C. Secured to the back side of the face plate 18 is the latch device 22. The latch device 22 is secured to the face plate 18 by way of latch cylinder mounts 82. A slave cylinder 64 is attached to latch cylinder mounts 82 by way of mounting block 80. The slave cylinder 64 is in fluid communication with hose assembly 60. The slave cylinder 64 has a bleeder screw 74 for bleeding fluid from the slave cylinder 64. Mounted between latch cylinder mounts 82 is latch 84. A stop block 94 is attached to the face plate 18 on each side of the latch 84 as best illustrated in FIG. 2. The stop block 94 is used in combination with the latch 84 to keep the refuse cart 98 on the refuse tipper 10 as shown in FIG. 6C.

FIGS. 2 and 3 illustrate how the master cylinder 30 and slave cylinder 64 are positioned relative to each other on the refuse tipper 10. The master cylinder 30 is secured to the face plate 18 between the face plate 18 and torque arm 16. Alternatively, the master cylinder 30 could be fixed to a torque arm 16 or any member that might be rotated relative to the rotary actuator 14 and/or some other component. For example, if hydraulic cylinders (not shown) were used to lift the refuse tipper 10, the master cylinder 30 could be attached to a member moved by the hydraulic cylinders to force fluid from the master cylinder 30. The master cylinder 30 has a rod 34 with a roller 38 attached at one end of the rod 34 for rolling along the roller path 26 of the cam plate 24. The master cylinder 30 is fluid communication with the slave cylinder 64 by way of hose assembly 60, which permits the present invention to be configured to fit endless styles and types of refuse tippers having different space, movement and operating requirements and limitations. For example, the master cylinder 30 may be positioned apart from the slave cylinder 64 on the refuse tipper 10 or wherever space permits.

Figure 4:
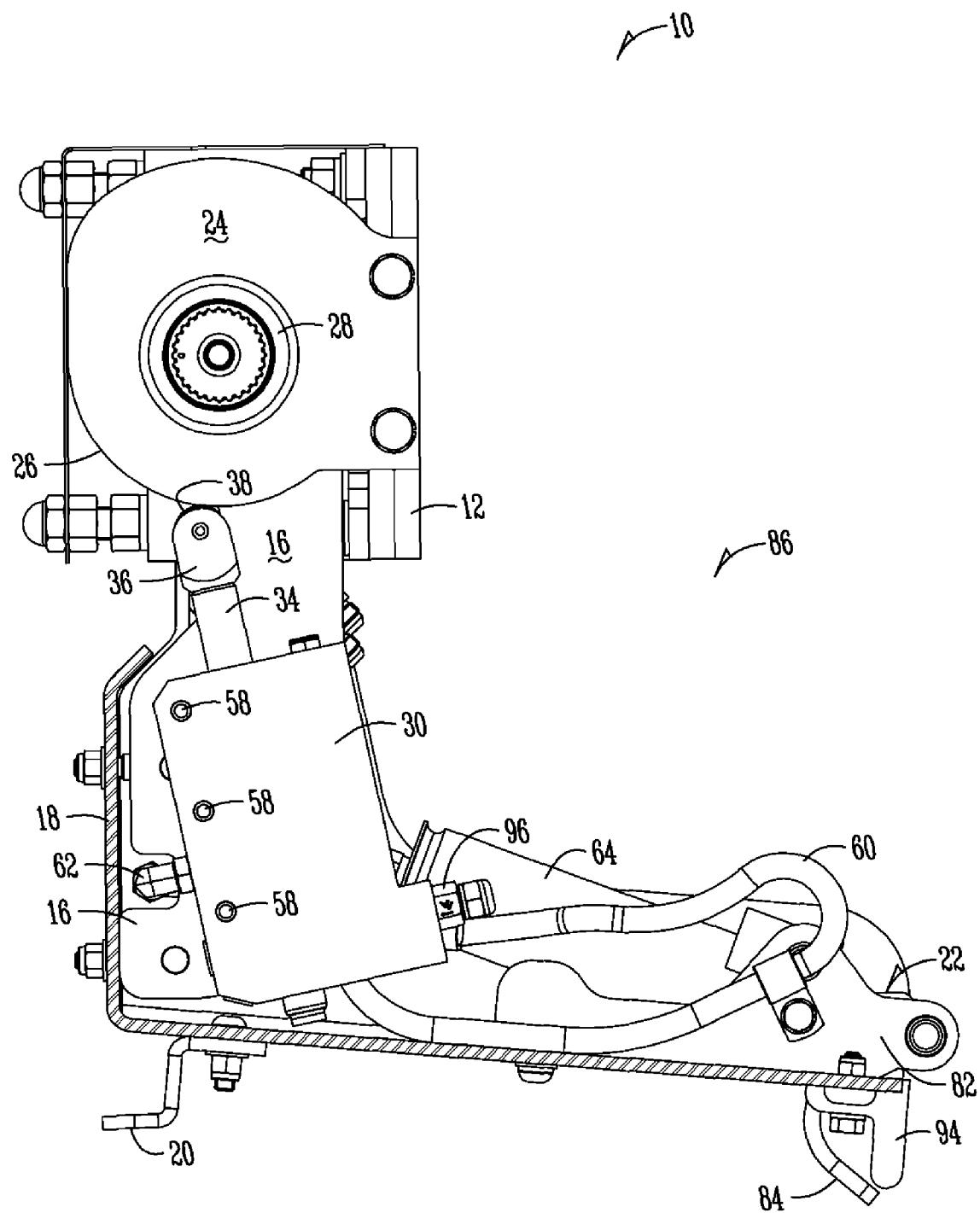
FIG. 4 is a cut-away view of the refuse tipper and latching device in a stowed position according to an exemplary embodiment of the present invention.

FIG. 4 shows a cut-away side view of one style or type of a refuse tipper 10 in the stowed position 86. In this view, the side of the face plate 18 shown in FIG. 1 is cut-away to expose and illustrate the different components used to operate the latching device 22. The stowed position 86 refers to the position of the refuse tipper 10 relative to the mounting plate 12. Thus, the use of the term stowed position 86 is only for the purposes of illustration. For instance, depending on the permittable rotation of the refuse tipper 10, the stowed position could be the positioned illustrated by the refuse tipper in FIG. 4 or in FIG. 5A.

In FIG. 4, the cam plate 24 is exposed to view. As shown, the cam plate 24 has an aperture 28 for purposes of accommodating the rotary actuator 14. A roller path 26 defines the outer periphery of the cam plate 24. Designed to follow along the outer periphery or roller path 26 of the cam plate 24 is roller 38. Roller 38 is secured to the rod 34 by way of rod end mount 36. Roller 38 rolls along the roller path 26 of the cam plate 24 when the rotary actuator 14 rotates torque arm 16. FIGS. 4 and 6A-6C illustrate how the roller 38 follows and rolls along the roller path 26 of the cam plate 24 when the rotary actuator 14 rotates torque arm 16 from the stowed position 86 to the dump position 92. The master cylinder 30 is attached to face plate 18 (cut away portion) by way of mounting holes 58 so the master cylinder moves with the torque arm. Similarly, the master cylinder 30 may be attached to the torque arm 16 or any other member that might be rotated relative to the rotary actuator 14 and/or some other component as previously discussed. The master cylinder 30 may be attached to either by way of a bolt, screw or rivet. The master cylinder 30 has a check valve 96 where fluid may be introduced into the master cylinder 30. This fluid may be forced out of the master cylinder 30 by compressing rod 34 so that fluid passes through fitting 62, hose assembly 60 and into slave cylinder 64 to operate the latching device 22 to thereby move latch 84.

As can be appreciated in FIGS. 4, 5A-5C and 6A-6C, the cam plate 24 may be shaped to create any desired roller path 26. For example, the roller path 26 or the outer periphery of the cam plate 24 may be a farther distance from the center of the cam plate 24 or a shorter distance from the center of the cam plate 24 at different positions along the roller path 26 depending upon the desired shape of the cam plate 24.

The use of the cam plate 24 to operate the latching device 22 is best illustrated in FIGS. 5A-5C and 6A-6C. FIGS. 5A-5C show the latching device 22 on one style of a refuse tipper 10 for dumping a refuse cart 98. For example, in FIG. 5A, the refuse tipper 10 and latching device 22 are in the engagement position 88. In this position, the refuse tipper engages the upper lip 100 of the refuse cart 98. If the refuse tipper 10 is in the stowed position 86, as illustrated in FIG. 4, the rotary actuator 14 has rotated the refuse tipper 10 to the engagement position 88 as shown in FIG. 5A. As discussed previously, depending on the type and style of refuse tipper 10, the position of the refuse tipper 10 illustrated in FIG. 5A may represent the engagement position 88 and stowed position 86 (shown in FIG. 4).

Figure 6A:
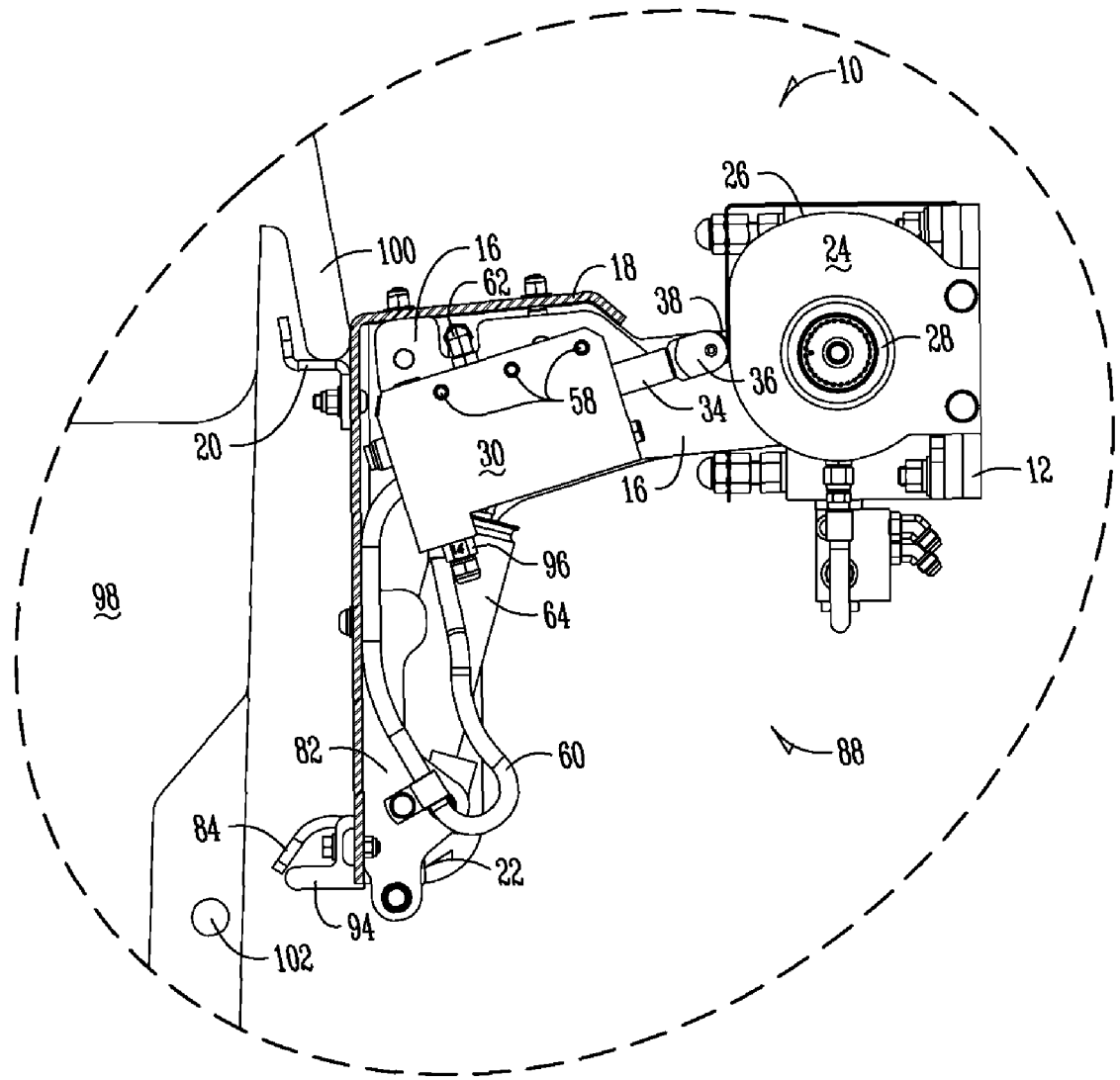
FIG. 6A is a sectional view of the refuse tipper and latching device taken along line 6A-6A in FIG. 5A.

Comparing FIG. 4 and FIG. 6A, one can see that roller 38 has traveled across the roller path 26, but the latch 84 position remains unchanged. The latch 84 remains in the same position from the stowed position 86 (FIG. 4) to the engagement position 88 (FIG. 6A) because the distance of the roller path 26 from the center of the cam plate 24 is unchanged. Thus, as the roller 38 travels along the roller path 26 of the cam plate 24, the rod 34 position remains unchanged with respect to the master cylinder 30 so there is no transfer of fluid from the master cylinder 30 into the slave cylinder 64 to operate the latch 84 (FIG. 6A).

Figure 6B:
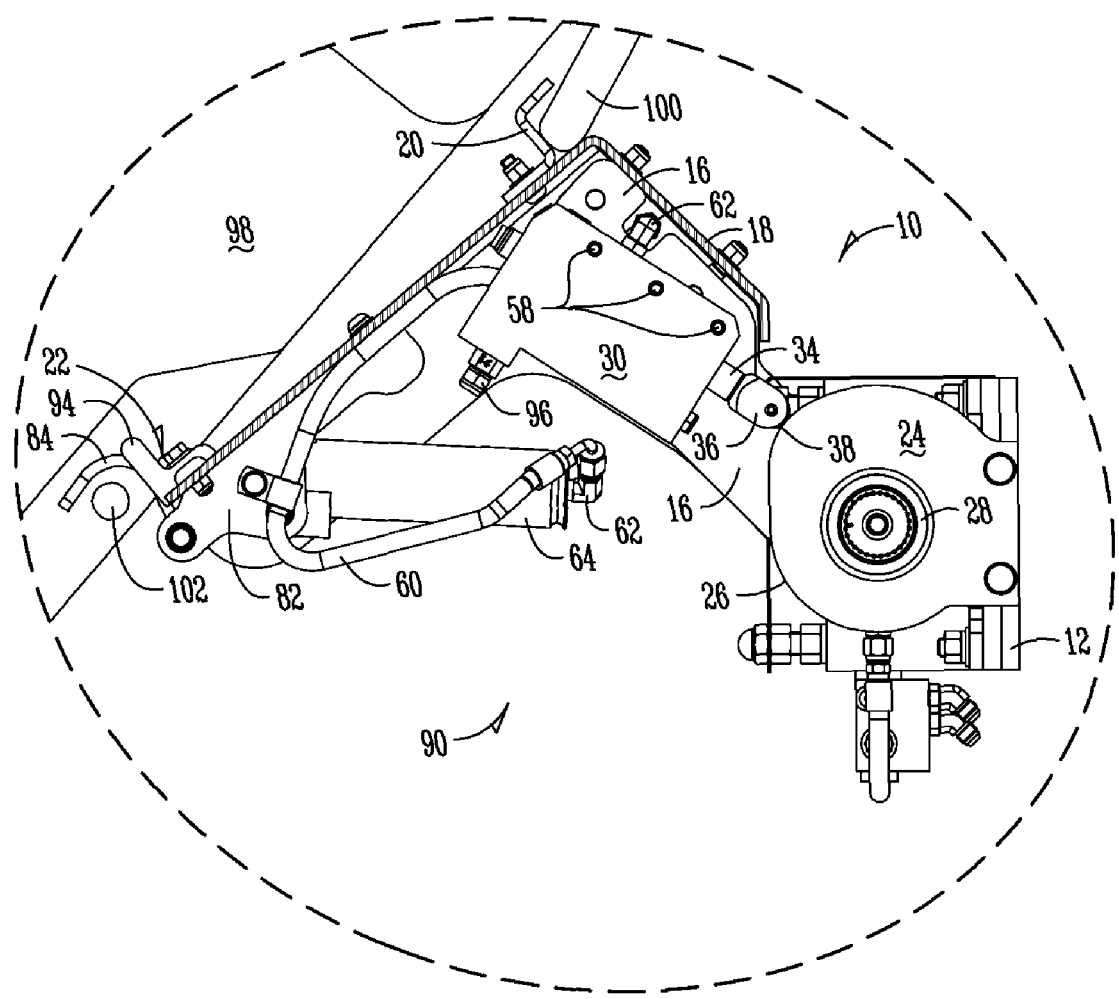
FIG. 6B is a sectional view of the refuse tipper and latching device taken along line 6B-6B in FIG. 5B.
Figure 6C:
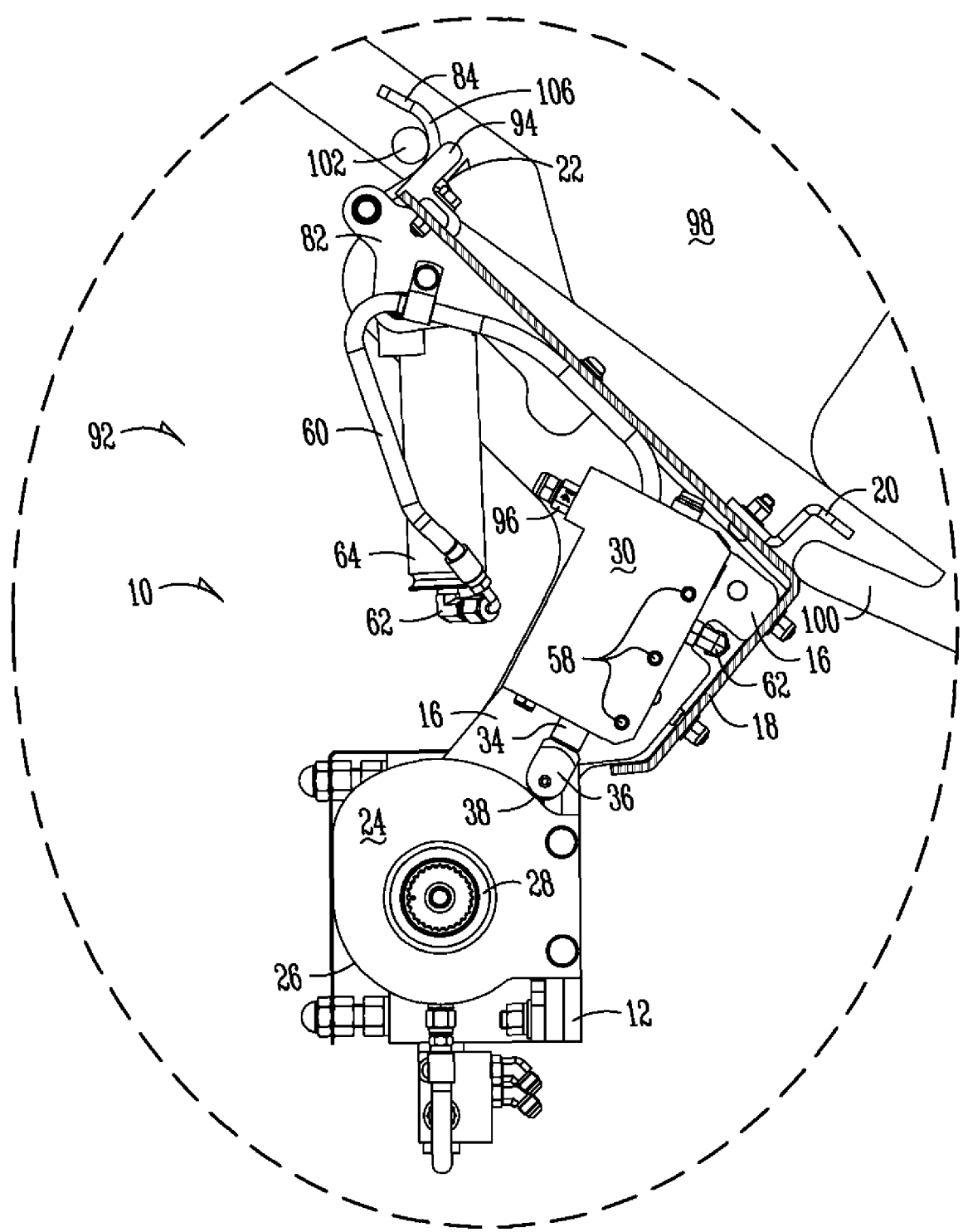
FIG. 6C is a sectional view of the refuse tipper and latching device taken along line 6C-6C in FIG. 5C.

FIGS. 5B and 5C show the refuse cart 98 in the lift position 90 and dump position 92, respectively. FIGS. 6B and 6C show sectional views for both the lift position 90 shown in FIG. 5B and the dump position 92 shown in FIG. 5C. In the lift position 90, as illustrated in FIG. 6B, the shape of the cam plate 24 begins to change; a larger distance separates the roller path 26 from the center of the cam plate 24. Because the master cylinder rotates by way of the rotary actuator 14 at a fixed distance from the center of the cam plate 24, the roller path 26 forces the rod 34 into the master cylinder 30—causes fluid to be forced into the slave cylinder 64 which operates the latching device 22—to move the latch 84 into a position over the lower bar 102 of the refuse cart 98. Continuing the rotation of the refuse tipper 10 from the lift position 90 shown in FIG. 6B to the dump position 92 shown in FIG. 6C, the rod 34 is driven farther into the master cylinder 30 which forces fluid from the master cylinder 30 into the slave cylinder 64 so the latch 84 moves into the latching position 106 as shown in FIG. 6C. Once the latch 84 is in the latching position 106, the cam plate 24 remains unchanged in shape and thereby retains the position of the latch 84 as the roller 38 travels along the remaining roller path 26 of the cam plate 24.

Figure 7A:
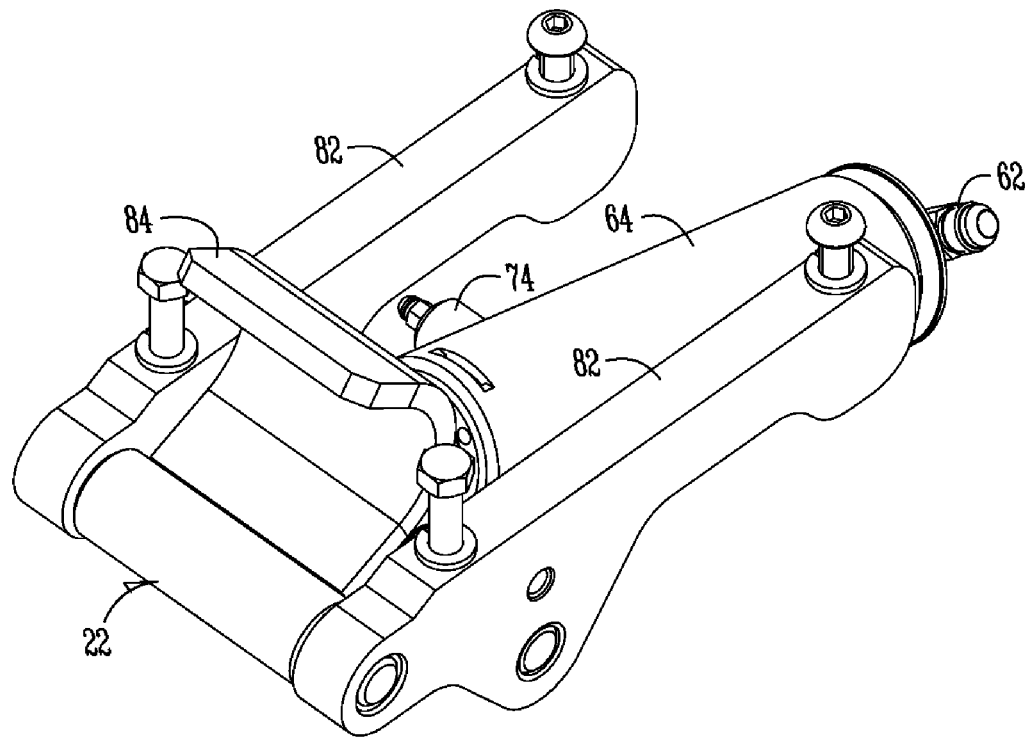
FIG. 7A is an isolation view of the latching device according to an exemplary embodiment of the present invention.
Figure 7B:
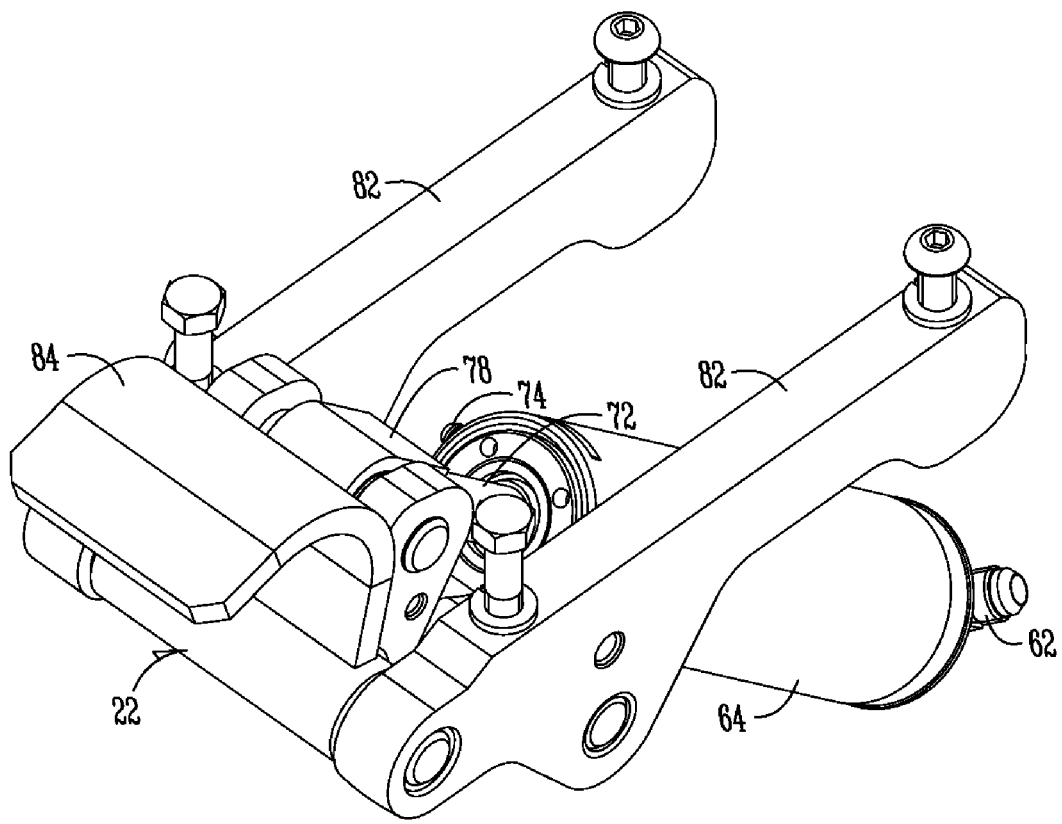
FIG. 7B is an isolation view of the latching device with slave cylinder extended according to an exemplary embodiment of the present invention.

FIGS. 7A and 7B illustrate how the latching device 22 moves upon actuation of the slave cylinder 64. The latching device 22 is attached to the slave cylinder 64 by way of rod end mount 78. The rod end mount 78 is attached to the rod 72 of the slave cylinder 64. Thus, fluid from the master cylinder 30 forces the rod 72 with rod end mount 78 attached to the latching device 22 outward away from the slave cylinder 64. The latching device 22 is rotatably mounted to latch cylinder mounts 82 so that the latching device 22 pivots. The slave cylinder 64 is mounted to the latch cylinder mounts 82 by way of the mounting block 80, as best illustrated in FIGS. 1 and 7B. The latch need not necessarily be rotatably mounted. For example, the latch could be designed to be a sliding latch where rollers on the latch are adapted to follow a channel for moving the latch between some extended (latching position) and some retracted position (stowed position).

Figure 7C:
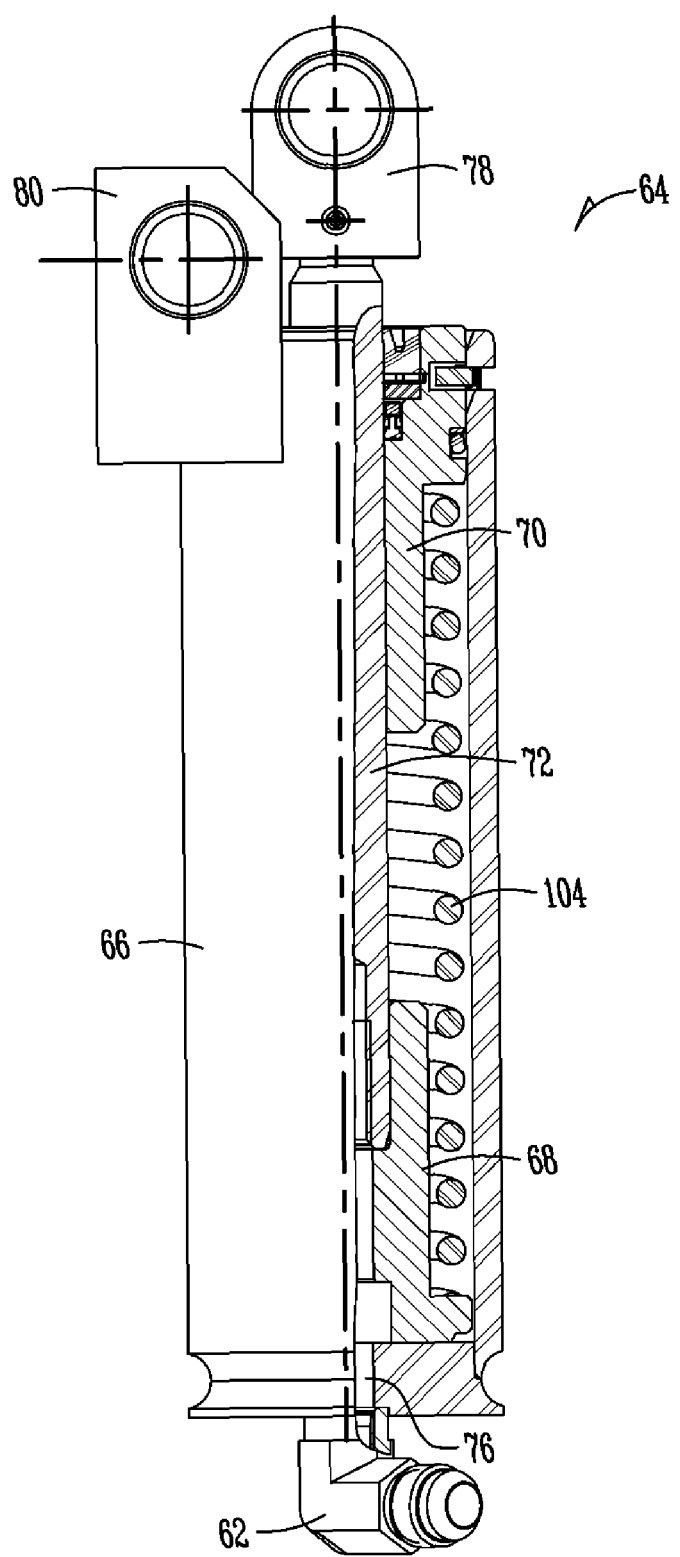
FIG. 7C is a cut-away view of the slave cylinder according to an exemplary embodiment of the present invention.

A cutaway view of the slave cylinder 64 is shown in FIG. 7C. The slave cylinder has a cylinder body 66 for housing rod 72, guide 68, spring 104, and head gland 70. Rod 72 is slidably mounted within the slave cylinder 64 and positioned through head gland 70. On one end of the rod 72 is attached rod end mount 78. On the other end of rod 72 is guide 68. Spaced between the head gland 70 and guide 68 is spring 104. In operation, fluid is introduced into the slave cylinder 64 through fitting 62 in port 76. Fluid introduced into slave cylinder 64 through port 76 displaces rod 72, as shown in FIGS. 7A and 7B. Because the rod 72 is force displaced by the fluid, port 76 could be positioned anywhere on the master cylinder 64. Spring 104 biases the guide 68 toward the port 76 side of the cylinder body 66. As rod 72 is drawn back into the cylinder body 66, fluid is displaced and forced from the slave Movement of the guide 68 toward the port 76 side draws the rod 72 back into the cylinder body 66, which retracts the latch 84 to the position shown in FIG. 7A. For example, when the refuse tipper 10 moves from the dumping position 92 back to the engagement 88 or stowed position 86, shown in FIGS. 4, 5A-5C and 6A-6C, the roller 38 is continually biased against the roller path 26 on the cam plate 24, which is accomplished by both the spring 42 within the cylinder 40 of the master cylinder 30 (shown in FIG. 8B) and fluid being displaced from the slave cylinder 64 as a result of the spring 104 acting on the guide 68 (shown in FIG. 7C).

In the preferred embodiment, the slave cylinder 64 is spring returned using spring 104 positioned within the cylinder body 66. Alternatively, spring 104 could be a single spring or multiple springs positioned on the outside of the slave cylinder 64 being adapted to retract the latch 84 (in FIGS. 7A & 7B).

Figure 8A:
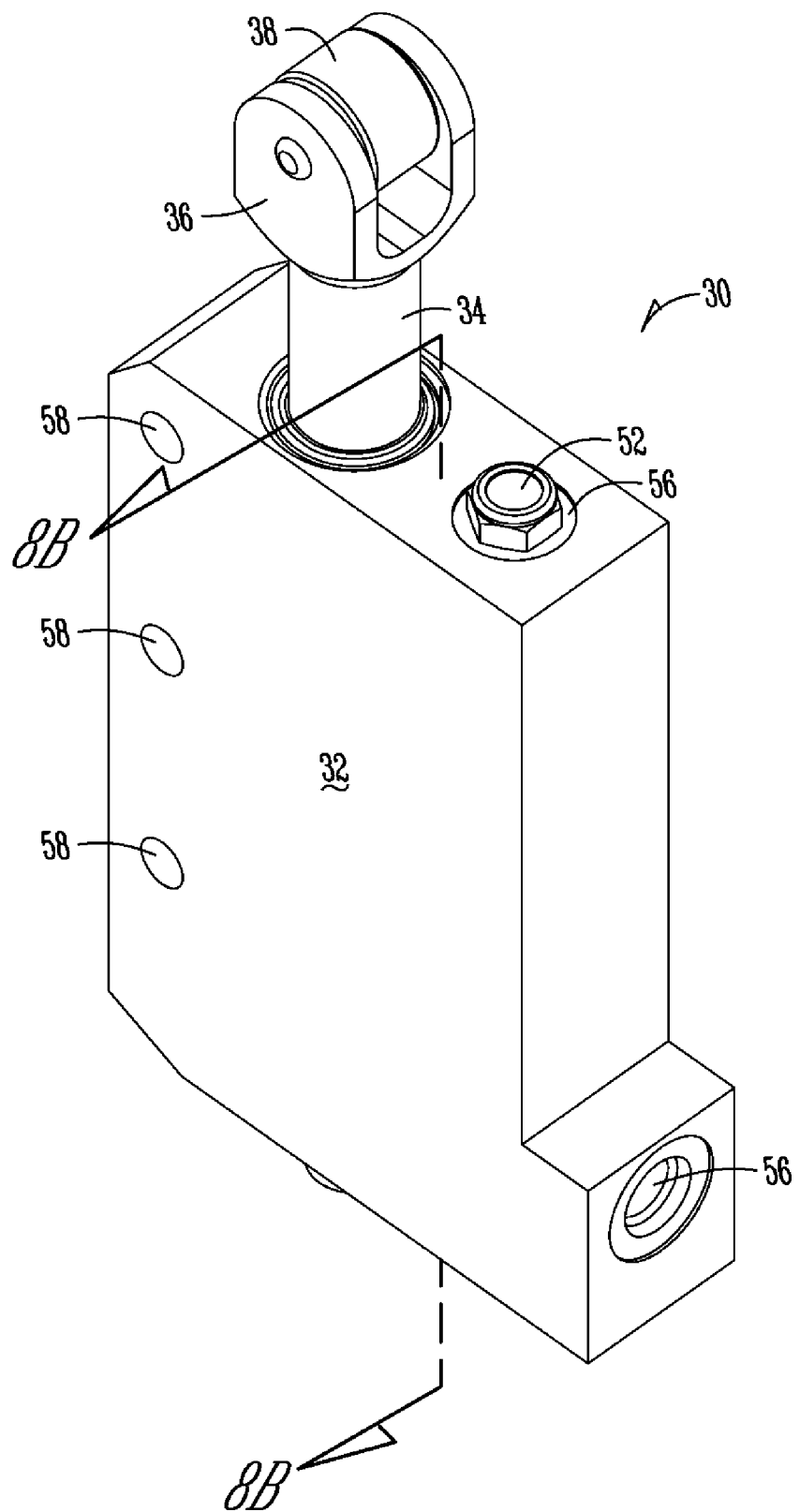
FIG. 8A is an isometric view of the master cylinder according to an exemplary embodiment of the present invention.

The master cylinder 30 is shown in FIG. 8A. The master cylinder has a cylinder body 32, ports 56 and mounting holes 58. The master cylinder 30 also has a rod 34 slidably mounted that moves in position relative to the cylinder body 32. On one end of the rod 34 is attached rod end mount 36. The rod end mount 36 is a carriage for roller 38. Port 56 near rod 34 has a breather 52.

Figure 8B:
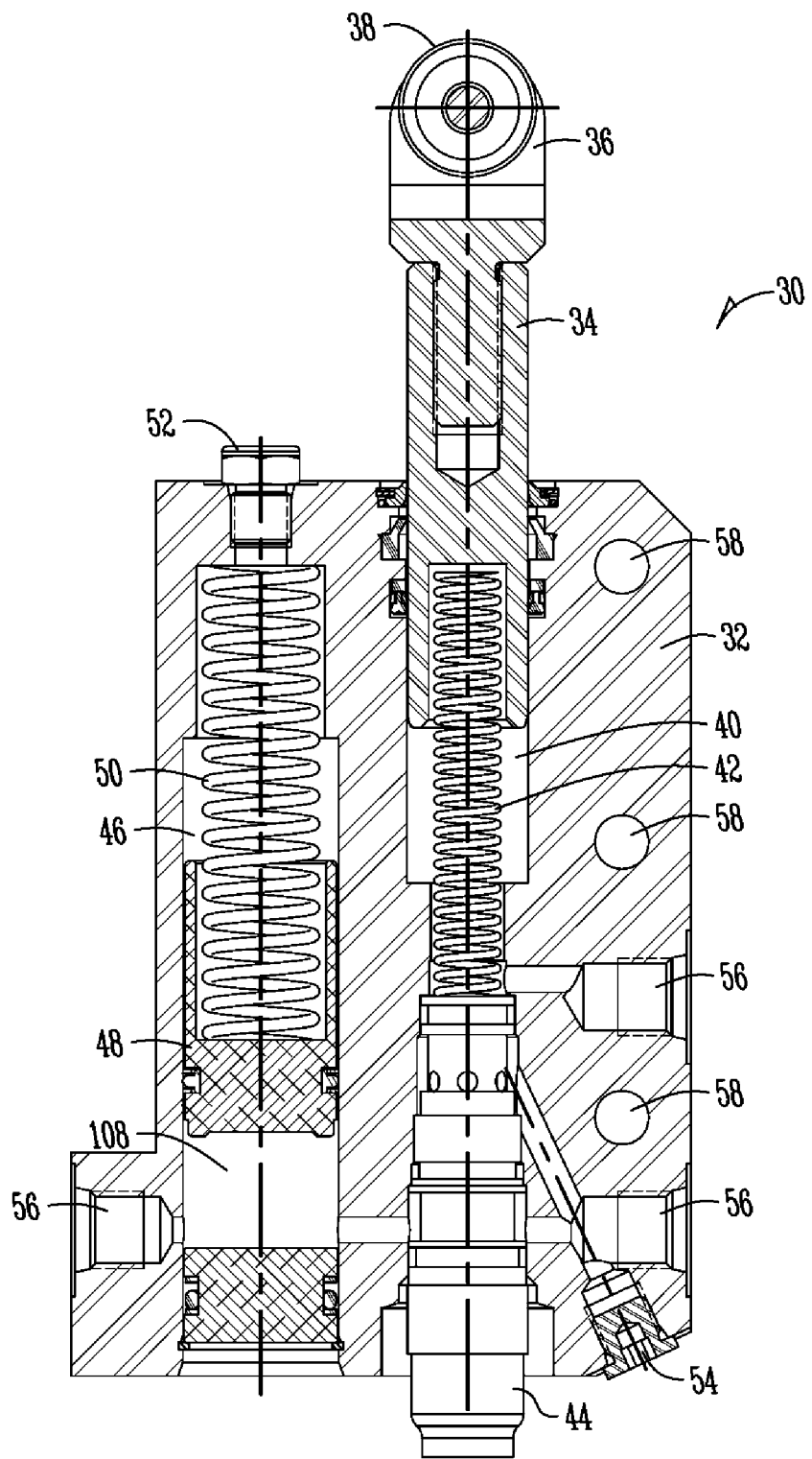
FIG. 8B is a sectional view of the master cylinder taking along line 8B-8B in FIG. 8A.

FIG. 8B shows a cross-sectional view of the master cylinder 30 taken along line 8B-8B in FIG. 8A. As shown in FIG. 8B, the rod 34 is slidably mounted with cylinder 40. The rod 34 is spring-biased with spring 42 to urge the rod 34 out of the cylinder 40. Fluid is forced out of cylinder 40 through port 56 (in fluid communication with the cylinder 40) when rod 34 is pushed into the cylinder. A plug, such as plug 54, is used to close unused ports on the master cylinder 30.

Positioned within the cylinder body 32 of the master cylinder 30 is an accumulator 46. Although the accumulator 46 is shown and described as being a single component with the master cylinder 30, it is understood that the accumulator 46 could be a separate component. For example, the accumulator 46 and master cylinder 40 could be separate components positioned apart on the refuse tipper 10, but fluidly connected with a fluid line, such as hose assembly 60.

A latching device is beneficial for holding a refuse cart to a refuse tipper. The latching device has a master cylinder in fluid communication with a slave cylinder. The slave cylinder is adapted to operate a latch to move from open to closed to thereby retain the refuse cart on the refuse tipper.

Positioned between the cylinder 40 and accumulator 46 is a counterbalance valve. The counterbalance valve 44 performs the same function of both a check valve and relief valve. Thus, the counterbalance valve 44 could be replaced with a separate check valve in combination with a separate relief valve. The check valve permits free flow of fluid from the accumulator 46 to the master cylinder 30 and the relief valve permits controlled flow (based upon pressure of the fluid) from the master cylinder 30 to the accumulator 46. In the preferred embodiment, the counterbalance valve 44 has a pressure relief setting for controlling the pressure at which fluid is allowed to pass from the cylinder 40 through the counterbalance valve 44 and into the accumulator 46. Thus, if fluid pressure in the master cylinder 30 exceeds the set point of the counterbalance valve 44, the valve opens to permit fluid to flow into the accumulator 46 to relieve the excess pressure. The counterbalance valve 44 helps protect the slave cylinder 64 and master cylinder 30 from being damaged by high fluid pressures. The counterbalance valve 44 also prevents the latching device 22, as shown in FIGS. 7A and 7B, from damaging the refuse cart 98 and/or the lower bar 102 (shown in FIGS. 5A-5C and 6A-6C). For instance, the position of the lower bar 102 relative to the upper lip 100 may vary between different refuse carts. If the lower bar 102 is closer to the upper lip 100 or outside the configured range of motion for the latch 84, the latch 84 would still try to move to the latching position (shown in FIG. 6C), but at the risk of either bending or breaking the lower bar 102 or causing damage to the master cylinder 30, slave cylinder 64, or any other component that might be exposed to large fluid pressures as a result of the latch 84 being obstructed in its movement. With the present invention, the counterbalance valve 44 allows fluid, under pressure exceeding the set point of the counterbalance valve 44 because of an obstruction in the movement of the latch 84, slave cylinder 64, or master cylinder 30, to be accumulated within the accumulator 46. When the obstruction is removed, the accumulator 46 reintroduces the fluid back into the cylinder 40 of the master cylinder 30 to recharge the master cylinder 30 with the fluid that was displaced due to the obstruction and resulting high fluid pressure. Thus, the counterbalance valve 44 will compensate for any fluid pressure spikes to prevent damage to the lower bar 102 of the refuse cart 98 and/or the various working components of the latching device 22, master cylinder 30 and slave cylinder 64.

Figure 8C:
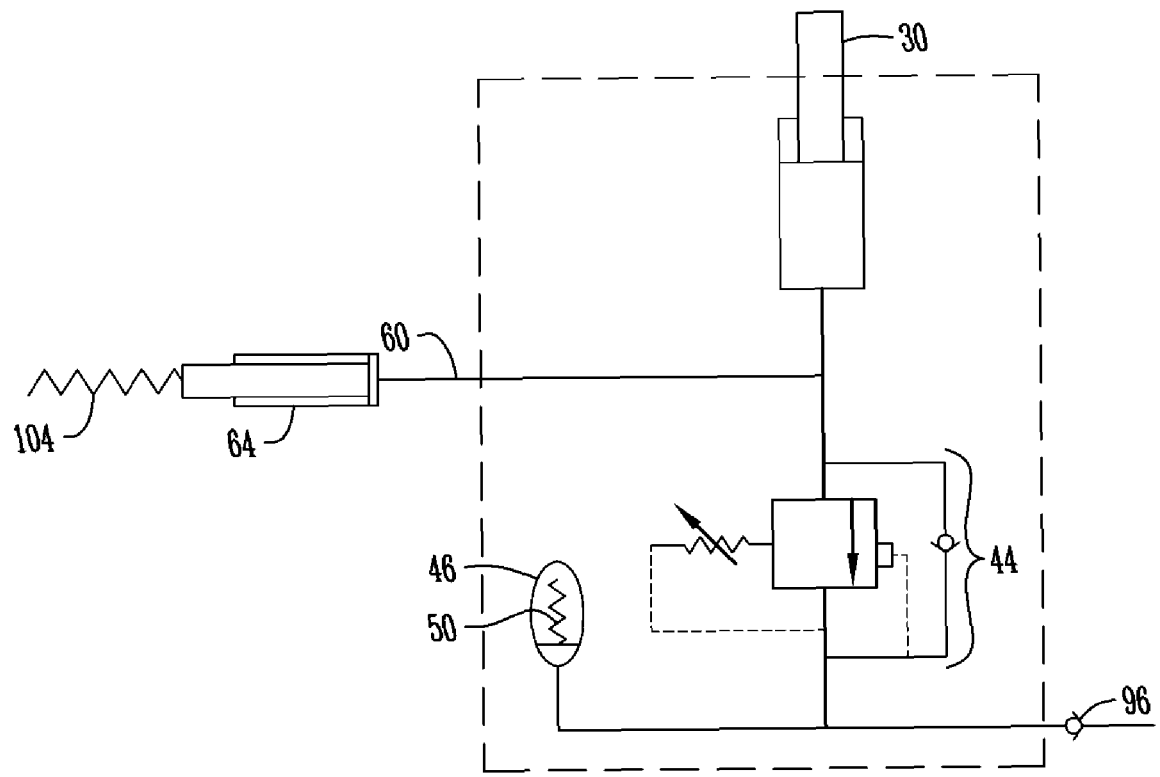
FIG. 8C is a hydraulic schematic of the latching device according to an exemplary embodiment of the present invention.

The hydraulic schematic in FIG. 8C best illustrates how the counterbalance 44 regulates the pressure between the slave cylinder 64 and the master cylinder 30. FIG. 8C shows the master cylinder 30 in fluid communication with the slave cylinder 64 by way of hose assembly 60 or fluid line. In FIG. 8C, the dashed box represents the master cylinder 30 shown in FIG. 8B. The master cylinder 30, counterbalance valve 44 and accumulator 46 are shown as a single component in the schematic, however, as previously discussed, these components could be separate components. FIG. 8C also shows slave cylinder 64 having a spring 104 for purposes addressed previously. For fluid to flow through the hose assembly 60, counterbalance 44 and into the accumulator 46, the pressure of the fluid must meet or exceed the set point of the counterbalance valve 44. For example, if the movement of latch 84 (shown in FIGS. 6A-6C) is obstructed in any way, the resulting increase in fluid pressure causes the counterbalance valve 44 to open so fluid can pass through the counterbalance valve 44 into the accumulator 46. Once fluid is introduced into the accumulator 46, it is stored in the accumulator under pressure as a result of spring 50. The accumulator 46 recharges the slave cylinder 64 and/or master cylinder 30 by pushing fluid back through hose assembly 60 into slave cylinder 64 and/or master cylinder 30.

The invention has been shown and described above with the preferred embodiments, and it is understood that many modifications, substitutions, and additions may be made which are within the intended spirit and scope of the invention. For example, the present invention describes the latch device 22 for gripping the lower bar 102 of a refuse cart 98, however, it should be understood from the present invention that the latching device 22 could also be configured for gripping the upper lip 100 on a refuse cart 98. From the foregoing, it can be seen that the present invention accomplishes at least all of its stated objectives.

What is claimed is:

1. A latching device for holding a refuse cart to a refuse tipper, the latching device comprises:
   a master cylinder in fluid communication with a slave cylinder, said master cylinder having a cylinder adapted to slidably receive a rod having a first end for movement within the cylinder and a roller operably attached to a second opposite end of the rod for movement without the cylinder; and
   the slave cylinder adapted to operate a latch to thereby retain the refuse cart on the refuse tipper.

2. The latching device of claim 1 wherein the roller is biased against a cam plate by a spring acting within the cylinder against the first end of the rod.

3. The latching device of claim 2 wherein the roller travels along the cam plate when moving the refuse tipper, the cam plate being adapted to time movement of the latch to thereby secure the refuse cart to the refuse tipper.

4. The latching device of claim 3 wherein travel of the roller along the cam plate moves the rod to force fluid through a hose into the slave cylinder.

5. The latching device of claim 4 wherein the master cylinder comprises an accumulator with a piston slidably mounted and spring biased therein to receive, store and release fluid under pressure.

6. The latching device of claim 5 wherein the master cylinder further comprises a counterbalance valve adapted to control movement of fluid between the accumulator and the cylinder.

7. The latching device of claim 6 wherein fluid is forced through the counterbalance valve into the accumulator if the latch is obstructed to thereby prevent damage to the latching device and/or the refuse cart.

8. The latching device of claim 1 wherein the slave cylinder further comprises a cylinder adapted to slidably receive a rod having a first end attached to and moved by a piston slidably mounted within the cylinder and a rod end mount operably attached to a second opposite end of the rod for movement without the cylinder.

9. The latching device of claim 8 wherein the latch is operably attached to the rod end mount.

10. The latching device of claim 9 wherein fluid forced from the master cylinder extends the latch into a latching position to hold a lower bar on the refuse cart.

11. The latching device of claim 10 wherein the slave cylinder further comprises a spring biased against the piston within the cylinder to thereby move the piston and the latch to a retracted position.

12. A latching device for holding a refuse cart to a refuse tipper, the latching device comprises:
a master cylinder in fluid communication with a slave cylinder, said master cylinder having a rod adapted to bias a roller against a cam shaped to drive the roller to thereby force fluid into the slave cylinder relative to the position of the refuse tipper;
a latch operably connected to the slave cylinder; and
the latch moved to a latching position by the slave cylinder to keep the refuse cart on the refuse tipper.

13. The latching device of claim 12 wherein the master cylinder further comprises an accumulator in fluid communication with a counterbalance valve to thereby prevent damage to the latching device and/or refuse cart by passing fluid into the accumulator when fluid within the master cylinder exceeds pressure settings for the counterbalance valve.

14. The latching device of claim 13 wherein the accumulator recharges the master cylinder and/or slave cylinder with fluid.

15. The latching device of claim 12 wherein the slave cylinder further comprises a spring for retracting the latch from the latching position and forcing fluid from the slave cylinder into the master cylinder.

16. A method for latching a refuse cart to a refuse tipper, the method comprising:
providing a latching device with a master cylinder in fluid communication with a slave cylinder, said master cylinder having a rod for forcing fluid out of the master cylinder having a roller spring biased against a cam plate shaped to drive the roller relative to the position of the refuse tipper, the slave cylinder being adapted to operate a latch for keeping the refuse cart on the refuse tipper;
forcing fluid from the master cylinder into the slave cylinder when moving the refuse tipper; and
extending the latch with the slave cylinder to keep the refuse cart on the refuse tipper.

17. The method of claim 16 further comprising the step of following the cam plate with the roller when moving the refuse tipper to thereby extend or retract the latch.

18. The method of claim 16 further comprising the step of retracting the latch for releasing the refuse cart from the refuse tipper by forcing fluid from the slave cylinder into the master cylinder.

19. The method of claim 16 further comprising the step of preventing damage to the refuse cart and/or the latching device by forcing fluid through a counterbalance valve into an accumulator when fluid pressure exceeds settings for the counterbalance valve.

* * * * *

UNITED STATES PATENT AND TRADEMARK OFFICE
CERTIFICATE OF CORRECTION

PATENT NO. : 7,828,353 B2
APPLICATION NO. : 11/696546
DATED : November 9, 2010
INVENTOR(S) : Rosenboom et al.

Page 1 of 2

It is certified that error appears in the above-identified patent and that said Letters Patent is hereby corrected as shown below:

On the Title Page:

Item (57) ABSTRACT:

DELETE: "Slidably mounted within the cylinder 108 of the accumulator 46 is a piston 48. A spring 50 is positioned behind the piston 48, which biases the piston 48 toward port 56. The portion of the cylinder 108 occupied by spring 50 is vented to the atmosphere by breather 52, which allows air to pass in and out of cylinder 108. As a result of the spring 50 acting on the piston 48, fluid is collected, stored, and released from the cylinder 108 under pressure. It should be understood that the accumulator could collect, store and release fluid under pressure using energy storage devices other than spring 50. For example, the accumulator 46 could be gas."

ADD: -- A latching device is beneficial for holding a refuse cart to a refuse tipper. The latching device has a master cylinder in fluid communication with a slave cylinder. The slave cylinder is adapted to operate a latch to move from open to closed to thereby retain the refuse cart on the refuse tipper. --

COL. 7, Lines 32-36:

DELETE: "A latching device is beneficial for holding a refuse cart to a refuse tipper. The latching device has a master cylinder in fluid communication with a slave cylinder. The slave cylinder is adapted to operate a latch to move from open to closed to thereby retain the refuse cart on the refuse tipper."

ADD: -- Slidably mounted within the cylinder 108 of the accumulator 46 is a piston 48. A spring 50 is positioned behind the piston 48, which biases the piston 48 toward port 56. The portion of the cylinder 108 occupied by spring 50 is vented to the atmosphere by breather 52, which allows air to pass in and out of cylinder 108. As a result of the spring 50 acting on the piston 48, fluid is collected, stored, and released from the cylinder 108 under pressure. It should be understood that the Signed and Sealed this
Eighteenth Day of January, 2011

David J. Kappos
*Director of the United States Patent and Trademark Office* accumulator could collect, store and release fluid under pressure using energy storage devices other than spring 50. For example, the accumulator 46 could be gas. --